United States Patent Office 3,223,693
Patented Dec. 14, 1965

3,223,693
FLUIDIZATION OF REACTION MIXTURE OF ORGANOALUMINUM-TITANIUM TETRACHLORIDE POLYMERIZED ISOPRENE BY ADDITION OF AN ORGANOMETALLIC COMPOUND
Ralph C. Farrar, Jr., Bartlesville, Okla., assignor to Phillips Petroleum Company, a corporation of Delaware
No Drawing. Filed Dec. 21, 1961, Ser. No. 161,281
8 Claims. (Cl. 260—94.3)

This invention relates to the preparation of cis-polyisoprene. In one aspect, the invention relates to an improvement in the process for polymerizing isoprene with an organoaluminum-titanium tetrachloride catalyst. In another aspect, the invention relates to the fluidization of the reaction mixtures obtained when polymerizing isoprene with an organoaluminum-titanium tetrachloride catalyst.

Natural rubber has long been employed in a variety of applications, a particularly important one being in the manufacture of automobile tires. Since rubber-like materials can be obtained from the milky juice of many varieties of rubber trees and plants, many different forms of natural rubber are described in the literature. The most commonly used rubber latex is that gathered from the tree *Hevea brasiliensis*. A great amount of work has been carried on to determine the chemical structure of natural rubber and to try to synthesize this material. It is generally accepted today that natural rubber is substantially the cis-polymer of isoprene (2-methyl-1,3,-butadiene) although attempts to produce this polymer synthetically have not in the past been entirely successful.

Recently, several process for preparing cis-polyisoprene have been described in the literature. In one of these processes, the cis-polymer is prepared by polymerizing isoprene in the presence of a catalyst comprising an organoaluminum compound and titanium tetrachloride. However, certain operational difficulties have been encountered when using this catalyst system to polymerize isoprene. Thus, when operating under conditions and with mol ratios of catalyst components which are required for the production of a rubbery polyisoprene having a high cis-content, the reaction mixture generally becomes very viscous and gelatinous in character, thereby rendering its removal from the reactor extremely difficult. Up to the present time, attempts to fluidize the reaction mixture during polymerization so as to facilitate removal of the reactor contents upon completion of the polymerization has met with little success. Although a certain degree of fluidization has been observed upon addition of isopropyl alcohol or similar materials subsequent to the polymerization, such treating agents are catalyst poisons and their use necessitates a thorough cleaning of the reactor after each application. The resulting frequent shutdowns make such a process very unattractive from a commercial standpoint.

It is an object of this invention, therefore, to provide a novel process for fluidizing the reaction mixture obtained when polymerizing isoprene with an organoaluminum-titanium tetrachloride catalyst system.

Another object of the invention is to provide a process for polymerizing isoprene in which the reaction mixture obtained is sufficiently fluid so that it can be readily transferred from the reaction zone to the polymer recovery zone.

Other and further objects and advantages of the invention will become apparent to those skilled in the art upon consideration of the accompanying disclosure.

The present invention is concerned with an improvement in a process for polymerizing isoprene in the presence of a catalyst which forms on mixing comprising an organo-aluminum compound and titanium tetrachloride. Broadly speaking, the improvement of this invention comprises the step of adding an organometallic compound to the reaction mixture obtained in the aforementioned polymerization. It has been found that the addition of such a compound to the reaction mixture produces an unexpected effect on the gelatinous mixtures formed during the polymerization. Thus, if the organometallic compound is added to the highly viscous polymerization mixture prior to quenching or shortstopping the reaction, the added material has a pronounced fluidizing effect on the mixture. As a result, the reaction mixture is rendered sufficiently fluid so that it can be further diluted and easily transferred by pumping or other means from the reaction zone to the polymer recovery zone.

The fluidizing agents which are added to the reaction mixture upon completion of the polymerization are organometallic compounds of the formula $R_nM$, wherein R is an alkyl, cycloalkyl, or aryl radical, or combinations of these radicals, e.g., alkaryl, aralkyl, alkylcycloalkyl, cycloalkylalkyl, cycloalkylaryl or arylcycloalkyl, preferably containing from 1 to 20 carbon atoms. M is a metal selected from the group consisting of lithium, sodium, calcium, magnesium, aluminum, gallium, indium, thallium, beryllium, cadmium, zinc, mercury and lead, and $n$ is equal to the valence of the metal M. Examples of suitable R radicals include methyl, ethyl, n-propyl, isopropyl, tert-butyl, n-hexyl, dodecyl, tridecyl, eicosyl, cyclopentyl, cyclohexyl, methylcyclohexyl, benzyl, phenyl, 4-tolyl, 2,4,6-trimethylphenyl, 4-tert-butylphenyl, 2-decylphenyl, 4-dodecylphenyl, 2,4-diheptylphenyl, 2-phenylethyl, 14 - phenyltetradecyl, 5,8-diphenyloctyl, 4-cyclohexylphenyl, 1-naphthyl, 2-naphthyl, 4-phenylcyclohexyl, 2-methyl-4-isopropylphenyl, 10-cyclopentyldecyl and the like. Specific examples of compounds of the formula $R_nM$ include trimethylaluminum, triethylaluminum, triisobutylaluminum, tri-n-butylaluminum, tri-n-pentylaluminum, triisooctylaluminum, tri-n-dodecylaluminum, triisooctadecylaluminum, tri - n-eicosylaluminum, tricyclopentylaluminum, triphenylaluminum, tri-p-tolylaluminum, tribenzylaluminum, diphenylethylaluminum, tri(3 - tert-butylcyclohexyl)aluminum, tri(4 - phenylcyclohexyl)aluminum, methylisopropylphenylaluminum, tri(10 - cyclopentyldecyl)aluminum, tri(4 - cyclopentylphenyl)aluminum, and the like. It is to be understood that corresponding compounds of lithium, sodium, calcium, magnesium, gallium, indium, thallium, beryllium, cadmium, zinc, mercury and lead can be used in the practice of the invention. It is usually preferred to employ as the fluidizing agent organometallic compounds of lithium, sodium, aluminum, zinc, and magnesium.

When proceeding in accordance with the present invention, isoprene is polymerized with a catalyst which forms on mixing comprising an organoaluminum compounds and titanium tetrachloride under conditions such as to produce a rubbery polymer having a high cis-content. The organoaluminum compounds used in the catalyst system can be presented by the formula $R_3Al$, wherein R is a hydrocarbon radical as defined above. The mol ratio of the aluminum compound to titanium tetrachloride is in the range of 0.6:1 to 1.5:1. The catalyst level used in the polymerization, based on the organoaluminum compound, ordinarily does not exceed 10 gram millimols per 100 grams of isoprene.

The polymerization process can be carried out over a relatively wide temperature range, e.g., from 0 to 100° C. It is usually preferred to operate at a temperature in the range of 25 to 75° C. The process is preferably carried out in the presence of a diluent which is inert to the polymerization reaction. The polymerization reaction can be conducted under autogenous pressures. It is usually desirable to operate at pressures sufficient to maintain the reaction mixture substantially in the liquid phase. The pressure will thus depend upon the particular material employed as the diluent and the temperature at which the polymerization is conducted. However, higher pressures can be employed if desired, these pressures being obtained by some such suitable method as the pressurization of the reactor with a gas which is inert with respect to the polymerization reaction.

Diluents suitable for use in the polymerization process are paraffins, cycloparaffins and/or aromatic hydrocarbons and mixtures of these which are liquid under the reaction conditions of the process. Examples of such diluents include benzene, toluene, and the xylenes, straight and branched paraffins containing up to and including 12 carbon atoms per molecule, such as n-butane, n-pentane, isoheptane, 2,2,4-trimethylpentane (isooctane), n-dodecane, and the like, and cycloparaffins such as cyclohexane and methylcyclohexane. It is frequently preferred to conduct the polymerization in n-pentane or similar low boiling diluent since the production of a desirable high molecular weight product is thereby facilitated.

It has been found that various materials may in some instances have a tendency to inactivate the organoaluminum-titanium tetrachloride catalyst. These materials include carbon dioxide, oxygen and water. It is usually desirable, therefore, to free the isoprene to be polymerized from these materials as well as from other materials which may tend to inactivate the catalyst before contacting the isoprene with the catalyst. Any of the known means for removing such contaminants can be employed. Furthermore, the hydrocarbon diluent employed in the process should also be free of contaminants, such as oxygen, water and the like. It is desirable also that air and moisture be removed from the reaction vessel before the reaction is carried out. This is usually accomplished by purging with an inert gas such as nitrogen. In some cases, small amounts of catalyst-inactivating materials, such as oxygen and water, can be tolerated in the reaction mixture while still obtaining reasonably good polymerization rates. It is to be understood, however, that the amount of such materials present in the reaction mixture shall not be sufficient to inactivate completely the catalyst.

After the polymerization has proceeded to completion or to a desired degree of conversion, the fluidizing agent as hereinbefore defined, is added to the unquenched polymerization mixture. The agent is added in such an amount that the mol ratio of the total amount of organometal compound charged (i.e., agent plus organoaluminum compound of the catalyst) to titanium is at least 2.5:1, preferably 3:1 to higher. In general, the fluidity of the polymerization mixture increases as the amount of the fluidizing agent is increased. However, the mol ratio of the total amount of organometal compound charged to titanium is usually not greater than 20:1, with a 10:1 mol ratio being preferred. The fluidizing agent can be added per se, but it is preferred to introduce it in solution in a hydrocarbon. Hydrocarbons similar to those used as the diluent in the polymerization can be used in preparing the solutions. Upon mixing or blending of the reaction mixture with the fluidizing agent, fluidization of the mixture occurs so that it can be readily transferred from the reactor or treating vessel. The treatment of the polymerization mixture with the fluidizing agent is usually carried out under substantially the same conditions of temperature and pressure as the polymerization. However, it is to be understood that any suitable temperature below the degradation temperature of the polymer can be used. Further reduction in the viscosity of the polymerization mixture can be obtained after treatment with the fluidizing agent by adding additional hydrocarbon to the mixture. The added hydrocarbon diluent may be the same or different from that utilized in the polymerization. A preferred diluent is a relatively low boiling paraffinic hydrocarbon, such as n-pentane. However, the fluidizing effect obtained by adding the hydrocarbon dilent does not result unless the polymerization mixture is first treated by addition of the fluidizing agent.

The polymerization process of this invention is preferably conducted as a batch process by charging the isoprene to a reactor containing catalyst and diluent. Thereafter, upon completion of the polymerization, the fluidizing agent of this invention is added to the polymerization mixture, followed by a hydrocarbon diluent. However, it is to be understood that the process of this invention can be adapted to a continuous operation by providing means for forcing the polymer mixture from the reactor into a vessel wherein the polymerization mixture is treated with the fluidizing agent. Treatment of the polymerization mixture with the fluidizing agent in the treating vessel renders the mixtures sufficiently fluid so that it can be pumped to the polymer recovery zone. A screw-type conveyor attached to the bottom of the polymerization reactor can be conveniently used to remove the polymerization mixture therefrom and to pass the mixture into the treating vessel. The residence time in a continuous process will vary within rather wide limits depending upon such variables as temperature and pressure. In a continuous process, the resistance time will generally fall within the range of 1 second to 1 hour or more when conditions within the specified ranges are employed. When a batch process is being utilized, the time for the reaction can be as high as 24 hours or more.

Upon completion of the fluidization step of this invention, the resulting fluid reaction mixture is then transferred to the polymer recovery zone wherein the reaction mixture is treated to inactivate the catalyst and recover the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be desirable to add an antioxidant, such as phenyl-beta-naphthylamine, to the treated reaction mixture prior to the recovery of the polymer. After addition of the catalyst-inactivating agent and the antioxidant, the polymer present in the solution can then be separated by addition of an excess of a material such as ethyl alcohol or isopropyl alcohol. It is, of course, to be realized that it is within the scope of the invention to utilize other suitable means to recover the polymer from the polymerization mixture.

The polymers produced in accordance with this invention are rubbery polymers of isoprene having a high percentage, e.g., from 75 to 99 percent, of cis 1,4-addition. The polymers can be compounded by the various methods such as have been used in the past for compounding natural and synthetic rubbers. Vulcanization accelerators, vulcanizing agents, reinforcing agents, and fillers such as have been employed in natural rubber can likewise be used when compounding the polyisoprene of this invention. It is also within the scope of the invention to blend the polymers with other polymers, such as cis-polybutadiene, butadiene-styrene copolymers, natural rubber, polyethylene, and the like. In general, the polymers have utility in applications where natural and synthetic rubbers are used. They are particularly useful in the manufacture of automobile and truck tires and other rubbery articles, such as gaskets,

EXAMPLE I

A series of runs was conducted in which isoprene was polymerized with a catalyst formed by mixing triisobutylaluminum and titanium tetrachloride. The following recipe was employed in these runs:

*Recipe*

| | Parts by weight |
|---|---|
| Isoprene | 100. |
| n-Heptane | 684. |
| Triisobutylaluminum (TBA) | Variable. |
| Titanium tetrachloride (TTC) | Variable. |
| TBA/TTC mole ratio | 1/1. |
| Temperature, °F. | 86 (30° C.). |
| Time, hours | 5. |

The runs were conducted in 12-ounce beverage bottles. The procedure followed in each of the runs was to charge the normal heptane to a bottle after which it was purged with nitrogen. Isoprene was then introduced into the bottle after which the triisobutylaluminum and the titanium tetrachloride were added in that order. The triisobutylaluminum was introduced as a 0.37 molar solution in heptane while the titanium tetrachloride was added as a 0.294 molar solution in heptane. The bottles were rotated in a constant temperature bath for a period of 5 hours. The bottles were then removed from the bath, and it was observed that a gelatinous mixture had been formed in each run.

Variable amounts of triisobutylaluminum and n-butyllithium were then added to certain of the reaction mixtures to determine the effectiveness of these materials as fluidizing agents. The triisobutylaluminum was added as a 0.41 molar solution in heptane while the butyllithium was added was a 0.28 molar solution in heptane. The bottles to which the fluidizing agents had been added were vigorously shaken. It was then observed that the polymerization mixtures to which the fluidizing agents had been added were less viscous than those which did not contain the agents. Thus, the polymerization mixture which did not contain the fluidizing agents were gelled and would not flow while those which did contain the agents were fluid and could be poured.

After the above-described treatment, the polymer products were recovered according to the following procedure. The polymerizations were short-stopped with a solution of an antioxidant [2,2'-methylene-bis(4-methyl-6-tert-butylphenol)] in a 50/50 volume mixture of toluene and isopropyl alcohol. The solution used was sufficient to give 2 parts by weight of the antioxidant per 100 parts of rubber. The polymer was then coagulated in isopropyl alcohol, separated and dried.

The amounts of materials used and the results obtained in the runs are shown below in Table I.

EXAMPLE II

Another series of runs was conducted in which isoprene was polymerized with a catalyst formed by mixing triisobutylaluminum and titanium tetrachloride. The polymerizations were conducted in the presence of variable amounts of normal heptane. The recipe employed in the runs is shown below.

*Recipe*

| Run No | 7 | 8 | 9 | 10 |
|---|---|---|---|---|
| Isoprene, parts by weight | 100 | 100 | 100 | 100 |
| n-Heptane, parts by weight | 342 | 171 | 86 | 43 |
| Triisobutyl aluminum, mmoles | 10 | 10 | 5 | 5 |
| Titanium tetrachloride, mmoles | 10 | 10 | 5 | 5 |
| Temperature, °F | 86 | 86 | 86 | 86 |
| Time, hours | 6.25 | 6.25 | 6.25 | 6.25 |
| Conversion, percent | 93 | 88 | 76 | 72 |

The procedure followed in the polymerizations was the same as that described hereinbefore in Example I. The triisobutylaluminum used in the catalyst of this series of runs was added as a 0.41 molar solution in normal heptane. At the end of the reaction period, it was observed that in each run a gelatinous mixture was formed.

The polymerization mixtures were then treated by adding a solution of triisobutylaluminum in n-pentane. The amount of n-pentane added in this manner was approximately equal to that of the n-heptane used in the polymerization runs. In runs 8, 9 and 10, an additional 313 parts was added after addition of the solutions of triisobutylaluminum in n-pentane. The amount of materials added in treating the gelatinous reaction mixtures is shown below in Table II.

TABLE II

| Run No. | 7 | 8 | 9 | 10 |
|---|---|---|---|---|
| Triisobutylaluminum, mmoles | 30 | 30 | 15 | 15 |
| n-Pentane, phr. (Initial) | 313 | 157 | 78 | 39 |
| n-Pentane, phr. (Additional) | None | 313 | 313 | 313 |
| n-Pentane, phr. (Total) | 313 | 470 | 391 | 352 |

After adding the materials shown in Table II, the bottles were shaken vigorously. It was observed that the gelatinous reaction mixtures were fluidized as a result of this treatment. The observation was also made that in the case of runs 8, 9 and 10 the additional n-pentane increased greatly the fluidity of the reaction mixture. However, without prior treatment with an organometallic compound as described herein, there is substantially no change in the viscosity of the mixtures even though an additional quantity of hydrocarbon diluent is added.

As will be evident to those skilled in the art, many variations and modifications of this invention can be practiced in view of the foregoing disclosure. Such variations and modifications are clearly believed to come within the spirit and scope of the invention.

I claim:

1. In a process for polymerizing isoprene which comprises polymerizing isoprene with a catalyst which forms

TABLE I

| Run No. | TBA | | TTC | | Fluidizing Agent | | Conv. percent | Inh. visc. | Gel, percent |
|---|---|---|---|---|---|---|---|---|---|
| | phm [1] | mhm [2] | phm [1] | mhm [2] | Type | mhm [2] | | | |
| 1 | 1.98 | 10.0 | 1.90 | 10.0 | | | 95 | 2.69 | 28 |
| 2 | 1.98 | 10.0 | 1.90 | 10.0 | TBA | 30.0 | 94 | 2.81 | 27 |
| 3 | 0.99 | 5.0 | 0.95 | 5.0 | | | 68 | 3.65 | 32 |
| 4 | 0.99 | 5.0 | 0.95 | 5.0 | TBA | 15.0 | 67 | 3.75 | 31 |
| 5 | 0.99 | 5.0 | 0.95 | 5.0 | BuLi | 10.0 | 64 | 3.32 | 26 |
| 6 | 0.99 | 5.0 | 0.95 | 5.0 | BuLi | 15.0 | 66 | 3.64 | 35 |

[1] Parts by weight per 100 parts monomer.
[2] Millimoles per 100 grams monomer.

The data in Table I demonstrate that addition of the fluidizing agents had no significant effect on the inherent viscosity or gel of the recovered polymer. In other words, one of the advantages in the use of the fluidizing agents of this invention is that they do not alter the properties of the polymer product.

on mixing components comprising (1) an organometallic compound having the formula $R_3Al$, wherein R is selected from the group consisting of alkyl, cycloalkyl, aryl, and combinations of these radicals, and (2) titanium tetrachloride, the mol ratio of said organometallic compound to titanium tetrachloride being in the range of 0.6:1 to 1.5:1, and said polymerizing occurring at a temperature in the range of zero to 100° C. in the presence of a hydrocarbon diluent, the improvement which comprises adding to the unquenched polymerization mixture obtained in the aforesaid polymerization which has proceeded to the desired degree of conversion a fluidizing agent having the formula $R_nM$, wherein R is as defined above, M is a metal selected from the group consisting of lithium and aluminum, and $n$ is equal to the valence of the metal M, the mol ratio of the total amount of said organometallic compound in said catalyst and said fluidizing agent to titanium in said catalyst being at least 2.5:1, blending said added fluidizing agent with said polymerization mixture, and thereafter adding hydrocarbon diluent to said mixture so as to obtain a fluid mixture.

2. The process according to claim 1 in which said fluidizing agent is added to said polymerization mixture as a solution in a hydrocarbon.

3. The process according to claim 2 in which said fluidizing agent is triisobutylaluminum and said hydrocarbon is normal pentane.

4. The process according to claim 1 in which said fluidizing agent is triisobutylaluminum.

5. The process according to claim 1 in which said fluidizing agent is triethylaluminum.

6. The process according to claim 1 in which said fluidizing agent is n-butyllithium.

7. The process according to claim 1 in which said fluidizing agent is tricyclopentylaluminum.

8. The process according to claim 1 in which said fluidizing agent is triphenylaluminum.

References Cited by the Examiner

UNITED STATES PATENTS

| | | | |
|---|---|---|---|
| 2,977,349 | 3/1961 | Brockway et al. | 260—94.3 |
| 3,026,313 | 3/1962 | Saltman | 260—94.3 |
| 3,058,971 | 10/1962 | Miller et al. | 260—94.3 |
| 3,094,514 | 6/1963 | Tucker | 260—94.3 |

FOREIGN PATENTS 796,845  6/58  Great Britain.

OTHER REFERENCES

J. Am. Chem. Soc., vol. 80, Nov. 5, 1958, pages 5615–5622, page 5618 pertinent.

JOSEPH L. SCHOFER, *Primary Examiner.*

M. LIEBMAN, *Examiner.*